US012335517B2

United States Patent
Chuang et al.

(10) Patent No.: US 12,335,517 B2
(45) Date of Patent: Jun. 17, 2025

(54) SHARED ARCHITECTURE FOR MULTIPLE VIDEO CODING MODES

(71) Applicant: MediaTek Inc., Hsinchu (TW)

(72) Inventors: Cheng-Yen Chuang, Hsinchu (TW);
Man-Shu Chiang, Hsinchu (TW);
Yu-Ling Hsiao, Hsinchu (TW);
Chun-Chia Chen, Hsinchu (TW);
Chih-Wei Hsu, Hsinchu (TW);
Tzu-Der Chuang, Hsinchu (TW);
Ching-Yeh Chen, Hsinchu (TW);
Yu-Wen Huang, Hsinchu (TW)

(73) Assignee: MediaTek Inc. (TW)

( * ) Notice: Subject to any disclaimer, the term of this patent is extended or adjusted under 35 U.S.C. 154(b) by 187 days.

(21) Appl. No.: 17/992,797

(22) Filed: Nov. 22, 2022

(65) Prior Publication Data

US 2023/0199217 A1 Jun. 22, 2023

Related U.S. Application Data

(60) Provisional application No. 63/291,990, filed on Dec. 21, 2021.

(51) Int. Cl.
*H04N 19/577* (2014.01)
*H04N 19/154* (2014.01)
(Continued)

(52) U.S. Cl.
CPC ......... *H04N 19/577* (2014.11); *H04N 19/154* (2014.11); *H04N 19/172* (2014.11); *H04N 19/176* (2014.11); *H04N 19/52* (2014.11)

(58) Field of Classification Search
CPC .. H04N 19/577; H04N 19/154; H04N 19/172; H04N 19/176; H04N 19/52;
(Continued)

(56) References Cited

U.S. PATENT DOCUMENTS

2022/0150532 A1* 5/2022 Yu .................. H04N 19/52

FOREIGN PATENT DOCUMENTS

| JP | 2015053701 A | * | 3/2015 | .......... H04N 19/105 |
| TW | 201316776 A |   | 4/2013 | |
| TW | I735172 B |   | 8/2021 | |

OTHER PUBLICATIONS

Taiwan Intellctual Property Office, Office Action in Taiwan Patent Application No. 111149216, Aug. 8, 2023.

* cited by examiner

*Primary Examiner* — Hesham K Abouzahra
(74) *Attorney, Agent, or Firm* — Andy M. Han; Han IP PLLC

(57) ABSTRACT

A video encoder receives raw pixel data to be encoded as a current block of a current picture of a video into a bitstream. The video encoder identifies multiple candidate bi-prediction positions for the current block, including a center position, a first set of offset positions, and a second set of offset positions. The first set of offset positions and the second set of offset positions interleave each other. The encoder computes distortion values for each of the candidate bi-prediction positions based on several possible weighting parameter values. The distortion values for the center position are based on each of the several possible weighting parameter values. The distortion values for the first set of offset positions are based on a first subset of the possible weighting parameter values. The distortion values for the second set of offset positions are based on a second subset of the possible weighting parameter values.

9 Claims, 9 Drawing Sheets

(51) Int. Cl.
*H04N 19/172* (2014.01)
*H04N 19/176* (2014.01)
*H04N 19/52* (2014.01)

(58) Field of Classification Search
CPC .. H04N 19/147; H04N 19/105; H04N 19/182; H04N 19/513
See application file for complete search history.

SHARED ARCHITECTURE FOR MULTIPLE VIDEO CODING MODES

CROSS REFERENCE TO RELATED PATENT APPLICATION(S)

The present disclosure claims the priority benefit of U.S. Provisional Patent Application No. 63/291,990, filed on Dec. 21, 2021, the content of which being incorporated by reference in its entirety.

TECHNICAL FIELD

The present disclosure relates generally to video coding. In particular, the present disclosure relates to hardware architectures configured to support multiple different coding modes.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are intra prediction and inter prediction. For intra prediction modes, the spatial neighboring reconstructed pixels can be used to generate the directional predictions. There are up to 35 directions in HEVC. For inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list should also be encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To determine the Merge index for the Skip and Merge modes, the Merge scheme is used to select a motion vector predictor among a Merge candidate set containing four spatial MVPs and one temporal MVP.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video encoder system that uses interleaving search pattern for finding a best weighting parameter value for encoding a block of pixels using Bi-prediction with CU-level Weights (BCW). The video encoder receives raw pixel data to be encoded as a current block of a current picture of a video into a bitstream. The video encoder identifies multiple candidate bi-prediction positions for the current block, including a center position, a first set of offset positions, and a second set of offset positions. The first set of offset positions and the second set of offset positions interleave each other. The encoder computes distortion values for each of the candidate bi-prediction positions based on several possible weighting parameter values. The distortion values for the center position are based on each of the several possible weighting parameter values. The distortion values for the first set of offset positions are computed based on a first subset of the possible weighting parameter values. The distortion values for the second set of offset positions are computed based on a second, different subset of the possible weighting parameter values. The video encoder selects a weighting parameter value for a candidate bi-prediction position based on the computed distortion values of the multiple candidate bi-prediction positions for the current block. The video encoder encodes the current block using bi-prediction based on the selected weighting parameter value and the selected candidate bi-prediction position.

In some embodiments, the encoder computes a distortion value based on a weighting parameter value at a candidate bi-prediction position by using the weighting parameter value to compute a bi-prediction that is a weighted average of a first prediction based on a first motion vector and a second prediction based on a second motion vector. The first and second motion vectors are identified based on the candidate bi-prediction position. The distortion of a particular possible weighting parameter value at a candidate bi-prediction position is a difference between the raw pixel data of the current block and the bi-prediction based on the particular possible weighting parameter value at the candidate bi-prediction position.

In some embodiments, the several possible weighting parameter values includes first, second, third, fourth, and fifth values. For the BCW coding tools, these five possible weighting parameter values correspond to −2, 3, 4, 5, and 10. The first subset of the plurality of possible weighting parameter values comprises the second, third, and fifth values (3, 4, and 10). The second subset of the plurality of possible weighting parameter values comprises the first, third, and fourth values (−2, 4, and 5). In some embodiments, the first and second subsets of the possible weighting parameter values share one possible weighting parameter value. The one shared possible weighting parameter value (4) corresponds to weighting the first and second predictions equally.

In some embodiments, the video encoder includes circuits that are configured to be shared by multiple different coding tools. The video encoder may include a low-complexity (LC) rate-distortion optimization stage (LC-RDO) and a high-complexity (HC) rate-distortion optimization stage (HC-RDO). The video encoder tries various coding tools and chooses the coding tool with the lowest RD-cost. In some embodiments, the distortion values are computed by an electrical circuit in the LC-RDO that is shared by multiple different coding tools, including BCW, Sub-block Transform (SBT), Adaptive motion vector resolution (AMVR), Decoder-side Motion Vector Refinement (DMVR), and Merge Mode with Motion Vector Difference (MMVD).

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

In latest video coding standard Versatile Video Coding (VVC), many new coding tools have been proposed to improve the coding efficiency. Examples of such coding tools include Advanced Motion Vector Prediction (AMVP), Geometric Prediction Mode (GPM), Adaptive Motion Vector Resolution (AMVR), Merge Mode with Motion Vector Difference (MMVD), Decoder-side Motion Vector Refinement (DMVR), Bi-prediction with CU-level Weights (BCW), Sub-Block Transform (SBT), among many others. A high-performance video encoder for the VVC standard can achieve high coding gain by supporting as many as these coding tools as possible. However, it is very inefficient to design a dedicated hardware circuits for each coding tool.

Some embodiments of the disclosure provide a video encoder that includes circuits that are configured to be shared by multiple different coding tools. The video encoder may include a low-complexity (LC) rate-distortion optimization stage (LC-RDO) as a first stage RDO and a high-complexity (HC) rate-distortion optimization stage (HC-RDO) as a second stage RDO. The video encoder tries various coding tools and chooses the coding tool with the lowest RD-cost. Since a coding tool may have multiple possible candidates, the LC-RDO stage is used to select a candidate with the lowest RD-cost. In some embodiments, the LC-RDO stage performs a simpler transformation such as Sum of Absolute Difference (SAD) or Sum of Absolute Transformed Difference (SATD) to simplify distortion calculation. The LC-RDO may select the candidate by performing the simpler transformation and/or without performing a full-search. The HC-RDO stage then uses the candidates provided by the LC-RDO to finalize the selection of the coding tool for encoding the current CU, including by performing standard transform such as DCT2.

In some embodiments, the LC-RDO includes circuits that are configured to be shared by the multiple different coding tools. Thus, to encode a CU, the video encoder may operate the LC-RDO under multiple different configurations for multiple different coding tools. In some embodiments, for each coding tool, the LC-RDO identifies a best candidate for the HC-RDO.

Figure 1:
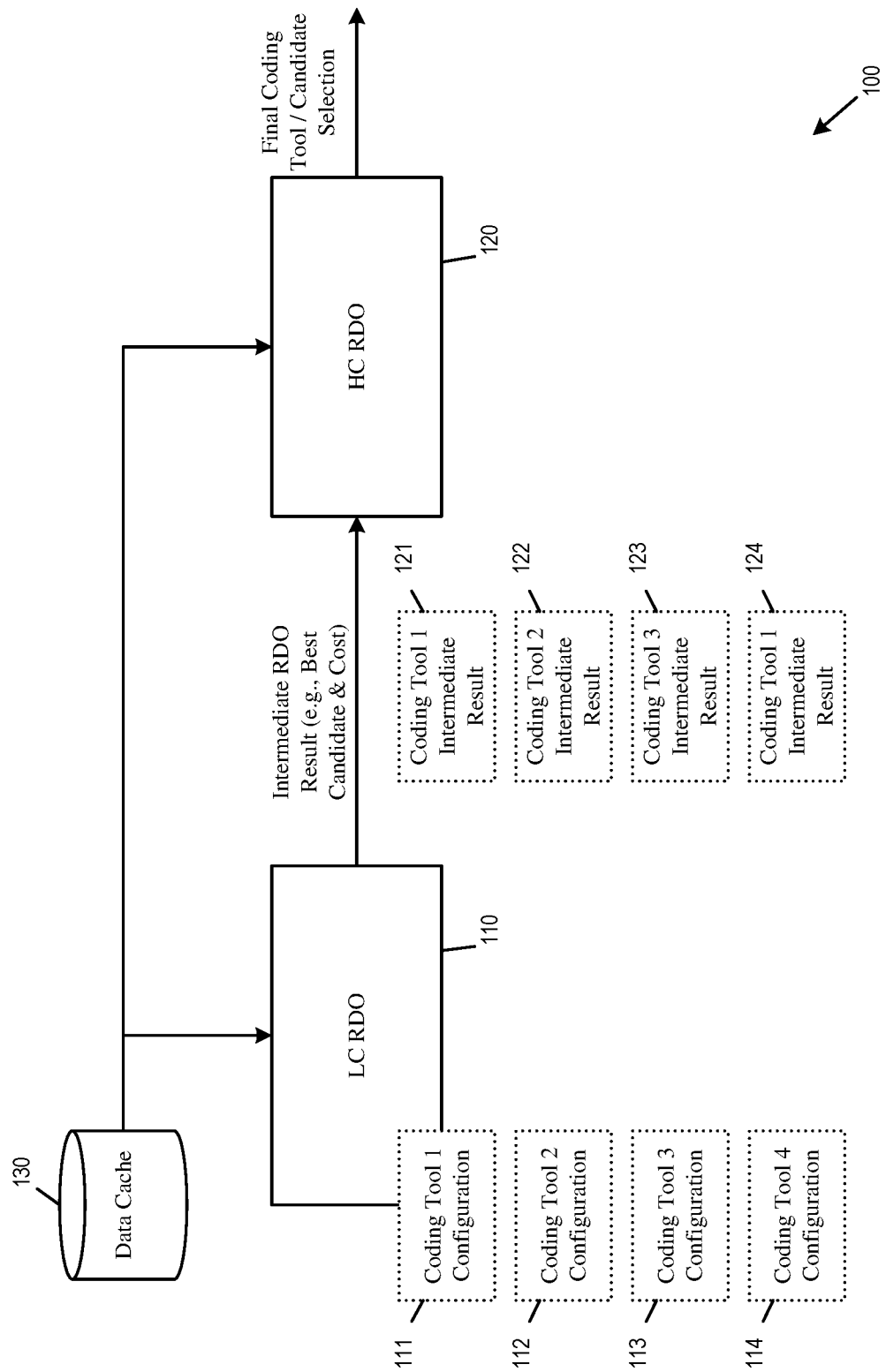
FIG. 1 conceptually illustrates a portion of a video encoder that uses an LC-RDO stage and a HC-RDO stage to select a coding tool and/or a prediction candidate for coding a current block.

FIG. 1 conceptually illustrates a portion of a video encoder 100 that uses an LC-RDO stage 110 and a HC-RDO stage 120 to select a coding tool and/or a prediction candidate for coding a current block.

As illustrated, the LC-RDO 110 and HC-RDO 120 together perform RDO function for the video encoder 100 so that the current block is encoded using the coding tool and prediction candidate with lowest cost in terms of rate and distortion. The LC-RDO stage 110 examines coding tools and prediction candidates to provide an intermediate result to the HC-RDO stage 120. The intermediate results produced by the LC-RDO 110 may include information such as the identity of the best prediction candidate for a particular coding tool and its associated cost. The HC-RDO may use the intermediate results to produce a final coding tool selection and a prediction candidate selection. The coding tool and prediction candidate selection are then used by the video encoder 100 to encode the current block.

Both the LC-RDO 110 and the HC-RDO 120 may retrieve data from the data cache 130, which may include storage for pixel data of the current picture (reconstructed or raw source) and of several reference pictures. The data cache 130 may also include storage for reference motion information, such as previously used motion vectors for other CUs. The LC-RDO and the HC-RDO may selectively retrieve data from the cache 130 based on the position of the current block as well as the coding tool and prediction candidate being examined.

The LC-RDO 110 includes circuits that are shared by different coding tools and can be configured to produce intermediate results for the different coding tools. Thus, the same LC-RDO 110 can be configured under a first configuration 111 to produce a first intermediate result 121 for a first coding tool, and then configured under a second configuration 112 to produce a second intermediate result 122 for a second coding tool, etc. The HC-RDO 120 uses the intermediate results of the different coding tools to finalize the selection of a coding tool and/or a prediction candidate for encoding the current block. In the figure, the coding tool configurations 111-114 are respectively used by the LC-RDO 110 to produce intermediate results 121-124 for the HC-RDO 120.

In some embodiments, the LC-RDO stage 110 may perform at least some of the following operations: (1) fetching data from the cache memory 130, (2) generating candidates, (3) calculating distortion using low-complexity transform, and (4) comparing RD-costs of different candidates. The winner candidate identified by the LC-RDO stage 110 is then provided to the HC-RDO stage 120. The same 4 operations of the LC-RDO can be used to identify the best candidates for different coding tools such as AMVP, MMVD, and GPM.

Figure 2:
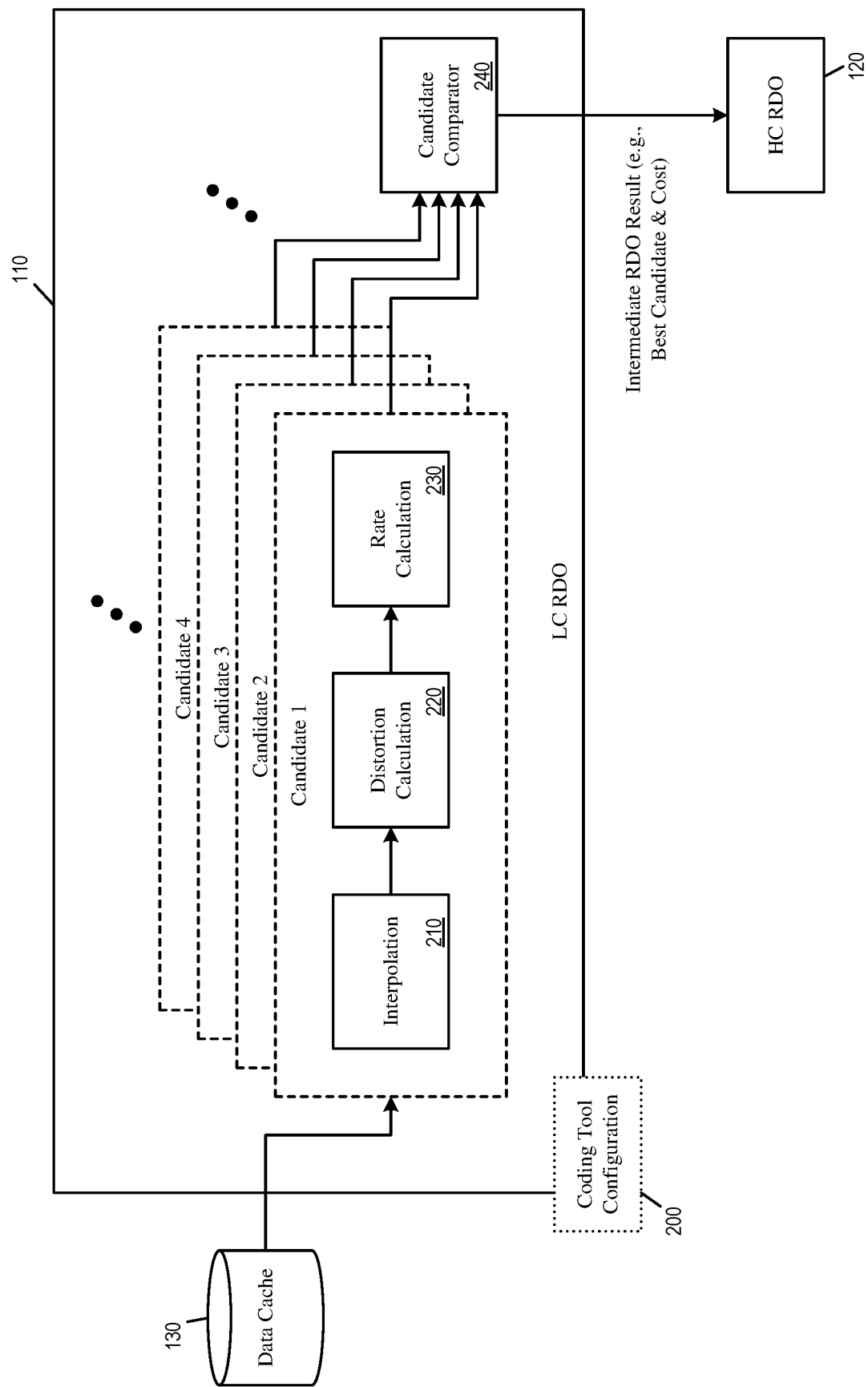
FIG. 2 conceptually illustrates the components of the LC-RDO.

FIG. 2 conceptually illustrates the components of the LC-RDO. The circuits of the LC-RDO are configured by a configuration data 200 for a particular coding tool to identify a best candidate for the coding tool and to provide a cost for using the candidate.

For each of several candidates, the LC-RDO 110 fetch data from the cache memory 130, apply interpolation 210, perform distortion calculation 220, and performs rate calculation 230. Based on the distortion and rate calculation, the LC-RDO 110 determines a cost value for each candidate. A comparator 240 compares the cost values of the different candidate to identify the best candidate for the particular coding tool.

The LC-RDO 110 performs the operations 210-230 according to the configuration data 200. The configuration data 200 may also configure the LC-RDO to omit one or more of the steps 210-230. In some embodiments, the LC-RDO may have circuitry that can be configured to examine multiple candidates in parallel (e.g., there are separate sets of circuits capable of examining different candidates simultaneously). In some embodiments, the LC-RDO may have circuitry that are shared by different candidates and can be configured to serially examine each candidate.

Figure 3:
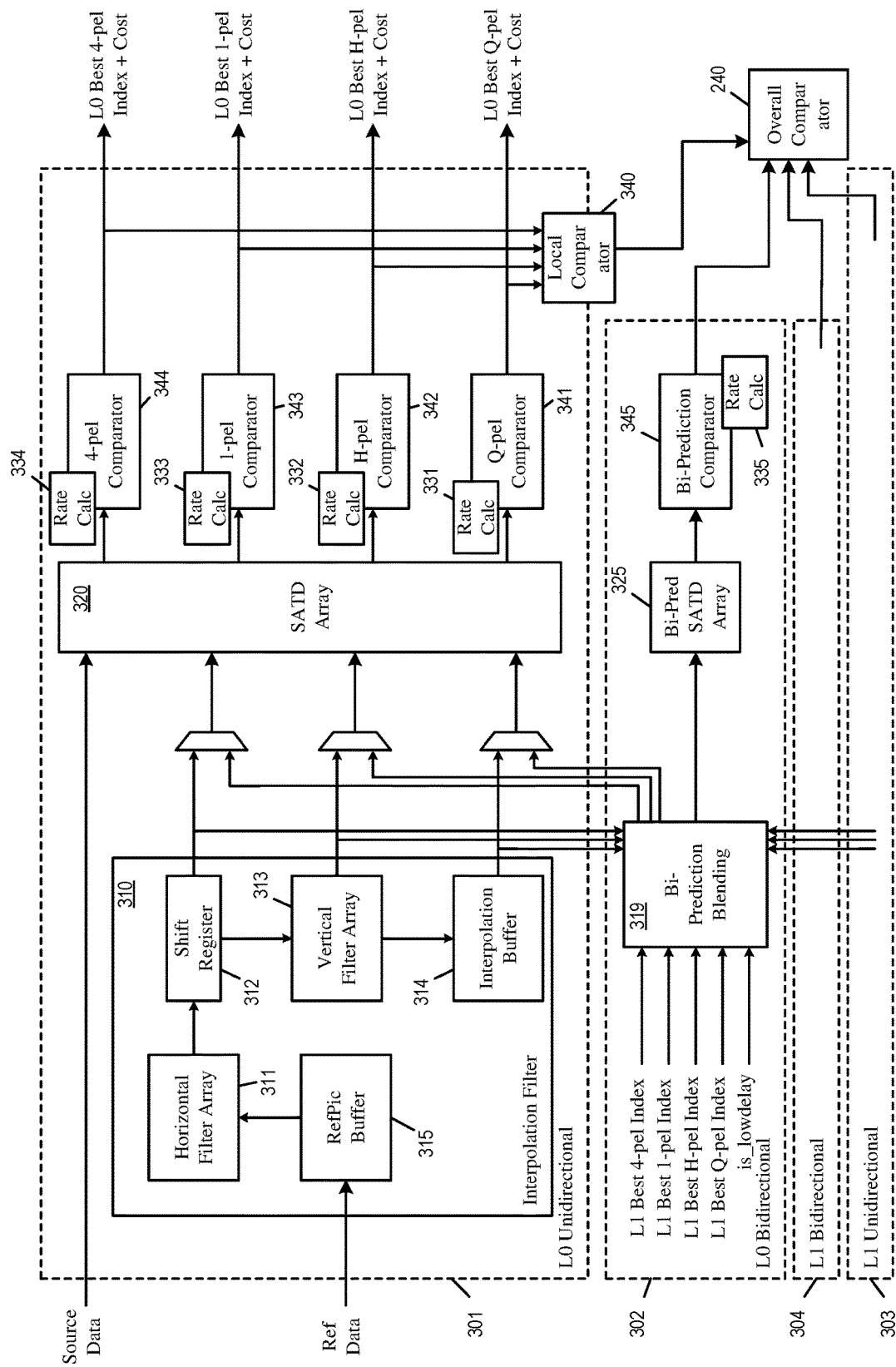
FIG. 3 illustrates an example implementation of the LC-RDO having share circuits for multiple different coding tools.

FIG. 3 illustrates an example implementation of the LC-RDO 110 having shared circuits for multiple different coding tools. The LC-RDO 110 includes a L0 unidirectional prediction section 301, an L0 bidirectional prediction section 302, a L1 unidirectional prediction section 303, and an L1 bidirectional prediction section 304. When configured for a coding tool, the circuits of each section calculate the distortions and rates of the candidates of that section. Each section has one or more local comparators to identify a best candidate with the lowest cost for that section. The overall comparator 240 compares the best candidates of the four sections 301-304 to identify the overall best candidate for the given coding tool based on costs derived from the calculated distortions and rates.

As illustrated, the L0 unidirectional prediction section 301 has an interpolation filter 310, a SATD array 320, rate calculators 331-334, and a local comparator 340. The interpolation filter 310 receives reference samples ("ref data") and generate filtered reference samples (e.g., for fractional positions) using a horizontal filter array 311, a shift-register 312, a vertical filter array 313, and an interpolation buffer 314. A reference picture buffer 315 is used to store pixel data of reference pictures as reference samples. The interpolation filter 310 can provide output from any of the components 311-314, and the SATD array 320 may use any of these outputs for its distortion calculation. The SATD array 320 performs distortion calculation based on source data (from video source) and (uni-directional) filtered reference samples from the interpolation filter 310. The SATD array 320 may also perform distortion calculation based on blended reference samples from L0 bidirectional prediction section 302. The outputs of the SATD array 320 are provided to the quarter-pel, half-pel, 1-pel, 4-pel comparators 341-344.

The output of rate calculators 331-334 are fed to the comparators 341-344 along with the output of SATD array 320. The comparators 341-344 in turn provides the cost values for different candidates at different pixel resolutions. The local comparator 340 compares these different candidates and identifies a best candidate for L0 uni-directional prediction.

The L0 bidirectional prediction section 302 has a bi-prediction blending module 319, a bi-prediction SATD array 325, a rate calculator 335, and a bi-prediction comparator 345. The bi-prediction blending module 319 performs weighted average to blend reference samples pixels from reference pictures at two different temporal positions (e.g., two uni-predictors for L0 and L1). The bi-prediction SATD array 325 calculates the distortions in the blended reference samples and provides distortion values to the bi-prediction comparator 345 and a rate calculator 335. In some embodiments, when performing L0 bi-prediction, the SATD array 320 can be reused for calculating distortion, and the comparators 331-334 can also be reused.

The figure illustrates components of the L0 bidirectional and the L0 unidirectional prediction sections 301 and 302. The components of the L1 unidirectional prediction section 303 and the L1 bidirectional prediction section 304 are not illustrated as they are analogous to the components of the L0 unidirectional prediction section 301 and the L0 bidirectional prediction section 302.

Each candidate is associated with a cost value that is computed based on the calculated distortion value and rate value. The overall comparator 240 compares the best candidates from the L0 unidirectional prediction section 301, the L0 bidirectional prediction section 302, the L1 unidirectional prediction section 303, and the L1 bidirectional prediction section 304.

The various components/circuits of the LC-RDO 110 can be shared by different coding tools. In some embodiments, at least some of the components of the LC-RDO can be configured to identify the lowest-cost candidates for various coding tools.

Merge Mode with Motion Vector Difference (MMVD) is a coding tool used by the Versatile Video Coding (VVC) standard. Unlike regular merge mode in which the implicitly derived motion information is directly used for prediction samples generation of the current CU. In MMVD, the derived motion information is further refined by a motion vector difference (MVD). MMVD also extends the list of candidates for merge mode by adding additional MMVD candidates based on predefined offsets (also referred to as MMVD offsets).

In some embodiments, the circuits of the LC-RDO 110 can be used to identify candidates for MMVD mode. For example, the horizontal filter array 311 and the vertical filter array 313 are general coefficient filters that can be configured for MMVD mode. The reference picture buffer 315 is sized sufficiently large to store reference samples needed by MMVD. The shift-register 312 and the interpolation buffer 314 are likewise sized sufficiently large to accommodate temporary result of vertical and horizontal filtering. Bidirectional prediction section's bi-prediction blending module 319 and bi-prediction SATD arrays 325 can be directly used for MMVD to calculate distortion. The overall comparator 240 can also be reused for MMVD.

Figure 4:
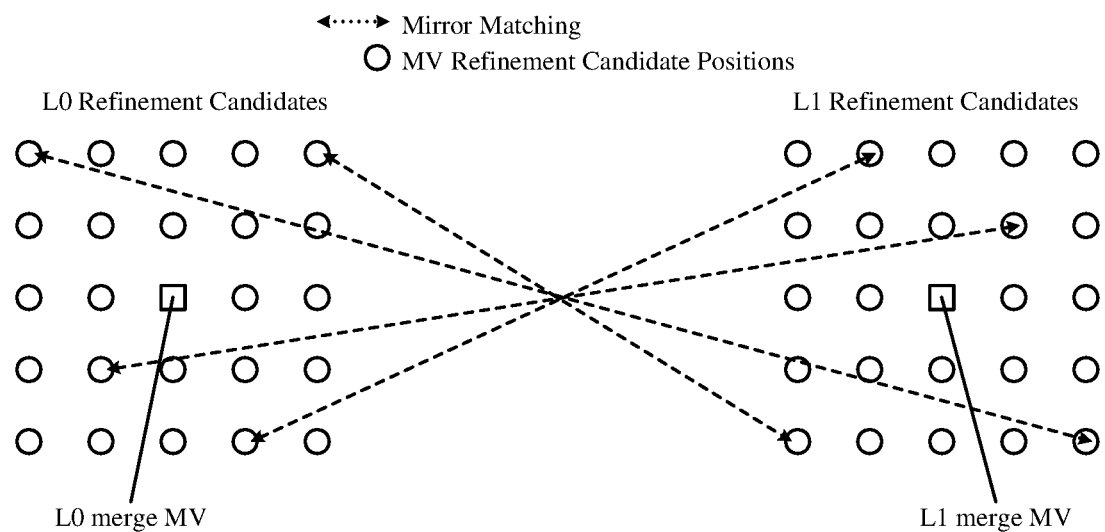
FIG. 4 conceptually illustrates mirror matching in DMVR.

Decoder-side Motion Vector Refinement (DMVR) is a coding tool that can be applied to regular merge candidates. According to DMVR, decoder follows the pre-defined step to refine a MV by (i) split the current CU into multiple 16×16/8×16/16×8 sub-blocks, (ii) use bilinear filter to generate 25 integer offset refinement candidates around the regular merge candidate, (iii) calculate the even-row SAD costs by mirror-matching, and (iv) apply fractional offset refinement if a pre-defined condition is met. FIG. 4 conceptually illustrates mirror matching in DMVR. The figure shows mirror matching between the 25 refinement candidate positions of the L0 merge MV and the 25 refinement candidate positions of the L1 merge MV.

The process of DMVR MV offset derivation has many similarities with LC-RDO stage. Thus, the circuits of the LC-RDO 110 stage can be shared with or reused by DMVR, with some modules being configured differently than for other coding tools. For DMVR, LC-RDO can be configured to (i) read data from cache, (ii) generate bilinear candidates, (iii) calculate even-row SAD cost, and (iv) compare the cost of each candidates to make fractional refinement and to output a refined merge MV. The refined merge MV is provided to the HC-RDO 120. For example, the horizontal filter array 311 and the vertical filter array 313 can be configured to perform bilinear filtering. The SATD array 320 can be configured to calculate SAD cost of even rows. The bidirectional blending module 319 can be configured to support mirror-matching. The reference picture buffer 315, the shift register 312, the interpolation buffer 314, and the local comparator 340 can be directly reused for DMVR. The comparators 341-344 can be configured to perform fractional refinement by e.g., constructing an error surface and then find the offset with minimum cost on the error surface.

Adaptive motion vector resolution (AMVR) allows coding of motion vector difference (MVD) at different precisions. There are 4 AMVR precisions in VVC: four-sample (4-pel), integer-sample (1-pel), half-sample (H-pel), and quarter-sample (Q-pel). In some embodiments, the example architecture of the LC-RDO 110 in FIG. 3 can be directly shared with AMVR, where the four comparators 331-334 correspond to the four AMVR precisions. More generally, the four AMVR precisions are processed by four separate PE-calls (e.g., using four separate hardware processing elements.)

Figure 5:
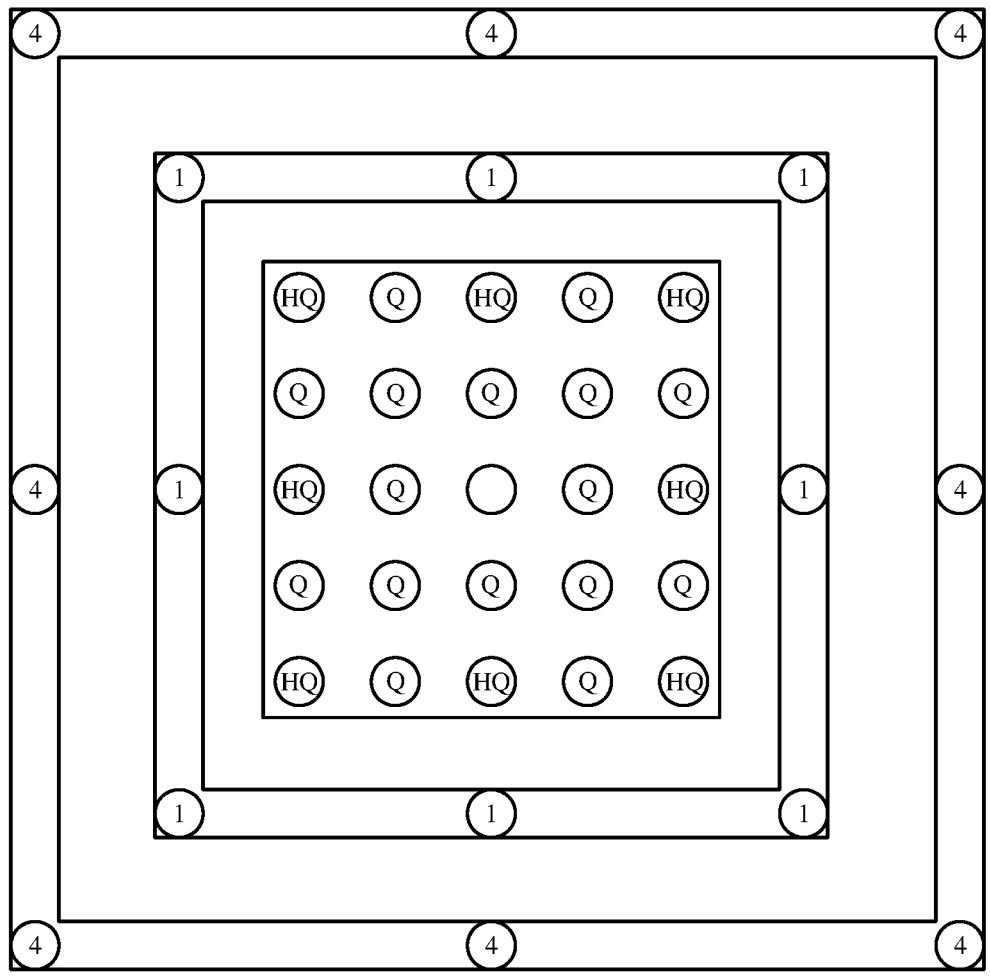
FIG. 5 conceptually illustrates aligning the four AMVR precisions by aligning their center MVs.

In some embodiments, the LC-RDO may perform the different AMVR precisions by one PE-call (using a same processing element), specifically by aligning the center MVs of the different AMVR precisions and performing RDO together. FIG. 5 conceptually illustrates aligning the four AMVR precisions by aligning their center MVs. Each circle in the figure represents a pixel position (integer and fractional). Circles labeled 'Q' are quarter-pel positions that uses 8-tap filter for interpolation, while circles labeled 'H' are half-pel positions that uses 6-tap filter for interpolation. Circles labeled 'HQ' are positions at which interpolation operations are performed for both half-pel and quarter-pel. Circles labeled '1' and '4' are respectively 1-pel and 4-pel positions that do not need to be interpolated.

By aligning the four precisions at their center MVs, all four AMVR precisions can be performed by one PE-call or have a subset of the AMVR precisions (e.g., 1-pel, H-pel, and Q-pel, but not 4-pel) into one PE-call. This is empirically shown to not have much impact on the BD-rate under certain conditions. It is observed that when the size of the current CU is large, AMVR side information becomes less significant. Some interpolation results of the four different precisions can be shared to further reduce the hardware cost.

Figure 6:
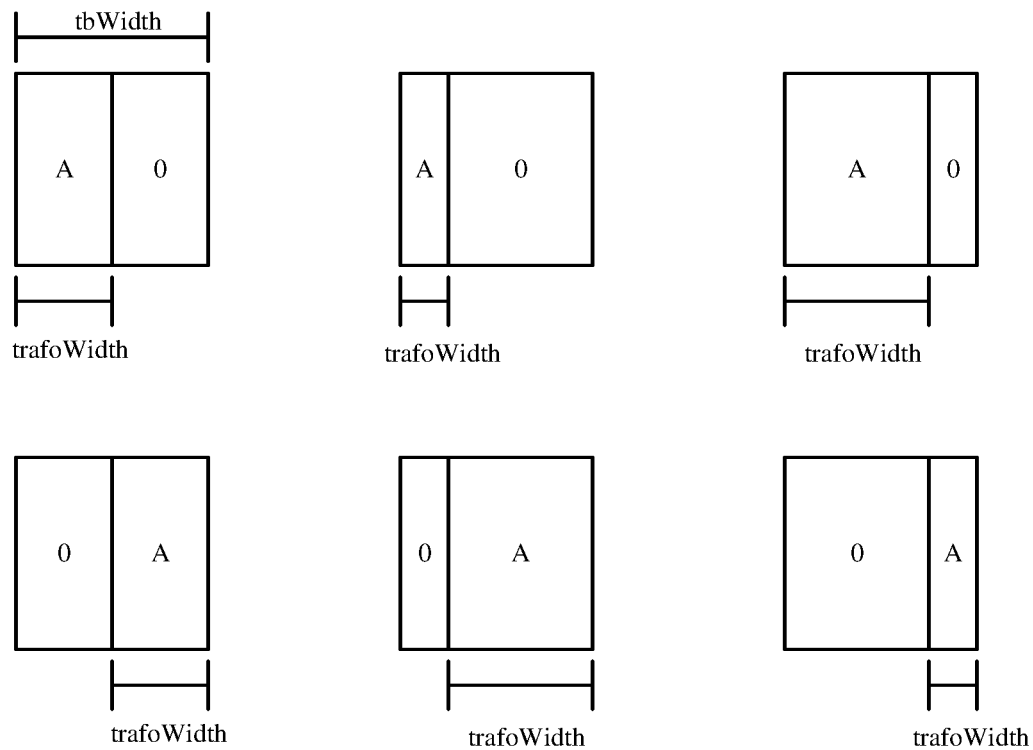
FIG. 6 illustrates various candidate modes for SBT that that divide the transform block into a coded portion and a zero portion.

Sub-block Transform (SBT) is a coding tool that is used for inter-predicted CUs, allowing the video encoder to perform transform on just a portion of the residual block or transform block. The coded portion of the transform block is encoded with an implicitly decided transform. The non-coded portion is zeroed out. SBT specifies many different candidate modes for dividing the transform block into the coded portion and the non-coded portion. FIG. 6 illustrates various candidate modes for SBT that that divide the transform block into a coded portion and a zero portion. In the figure, for each candidate SBT mode, the coded portion of the transform block is labeled 'A', and the non-coded portion is labeled '0'. The width of the transform block is referred to as tbWidth. The width of the coded portion is referred to as trafoWidth.

The various candidate modes for SBT in FIG. 6 may be enabled or disabled by a cu_sbt_quad_flag, a cu_sbt_horizontal_flag, and a cu_sb_pos_flag. The cu_sbt_quad_flag indicates whether trafoWidth:(tbWidth-trafoWidth) can be 2:2 or 1:3 or 3:1. The cu_sbt_horizontal_flag indicates whether the transform block is split horizontally or vertically for SBT. The cu_sb_pos_flag indicates whether left/top subblock has nonzero transform coefficient with right/bottom zeroed out, or right/bottom subblock has nonzero transform coefficients with left/top is zeroed out.

Instead of trying all possible candidate modes for SBT at the HC-RDO stage, in some embodiments, the LC-RDO stage is used to identify a candidate mode with the smallest cost for coding a transform block. In some embodiments, the LC-RDO calculates the residual cost for each candidate mode for SBT by a weighted average of the SSD of the transform coded portion and the SSD of the zero-out portion. Specifically, the cost of each candidate mode is calculated according to the following:

$$S_1 = SSD(residual_{trans}^2), \quad \text{(Eq. 1)}$$
$$S_2 = SSD(residual_{zero}^2)$$
$$\text{cost} = \frac{S_1}{32} + S_2$$

The LC-RDO would select the candidate mode with the lowest cost (computed according to Eq. 1) to be tested in HC-RDO. This is referred to as SBT-preselection. Thus, in some embodiments, instead of having the HC-RDO trying each possible candidate mode for SBT, the video encoder can perform SBT-preselection at the LC-RDO. The HC-RDO then performs candidate selection based on the result of the SBT pre-selection.

The LC-RDO 110 can be configured to perform SBT pre-selection. Specifically, the residuals of individual candidate modes of SBT can be provided to the SATD array 320, which can then calculate the cost of each candidate mode according to Eq. 1 above.

Bi-prediction with CU-level Weight (BCW) is a coding tool that is used to enhance bidirectional prediction. BCW allows applying different weights to L0 prediction and L1 prediction before combining them to produce the bi-prediction for the CU. For a CU to be coded by BCW, one weighting parameter w is signaled for both L0 and L1 prediction, such that the bi-prediction result $P_{bi\text{-}pred}$ is computed based on w according to the following:

$$P_{bi\text{-}pred} = ((8-w)*P_0 + w*P_1 + 4) >> 3 \quad \text{(Eq. 2)}$$

$P_0$ represents pixel values predicted by L0 MV (or L0 prediction). $P_1$ represents pixel values predicted by L1 MV (or L1 prediction). $P_{bi\text{-}pred}$ is the weighted average of $P_0$ and $P_1$ according to w. For low delay pictures, i.e., pictures using reference frames with small picture order counts (POCs), the possible values for w include {−2, 3, 4, 5, 10}. For non-low-delay pictures, the possible values for w include {3, 4, 5}. In some embodiments, to find a best w for coding the current CU, instead of searching all possible values of w for all candidate bi-prediction MV positions, the LC-RDO stage may employ an interleaving search pattern for finding the best value for the BCW weighting parameter w.

Figure 7:
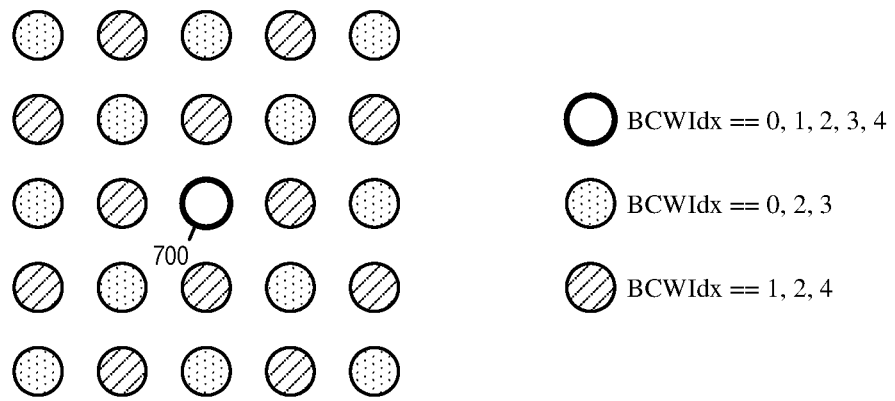
FIG. 7 conceptually illustrates the interleaving search pattern for finding a best BCW weighting parameter value.

FIG. 7 conceptually illustrates the interleaving search pattern for finding a best BCW weighting parameter value. In the figure, the weight indices (BCWIdx) 0, 1, 2, 3, 4 correspond to possible BCW weighting parameters values −2, 3, 4, 5, 10, respectively. The search pattern is for an array or arrangement of candidate bi-prediction MV positions. The candidate bi-prediction MV positions in the arrangement include a center position 700 and a multitude of vertical and/or horizontal offset positions (±1, ±2, etc.) based on the center position 700.

For each candidate bi-prediction MV position, the LC-RDO computes distortion values that correspond to each of the possible w values for that position. As illustrated, at the center bi-prediction MV position 700, the LC-RDO stage tries to find a best value for w by trying weight indices 0, 1, 2, 3, 4, which respectively correspond to BCW weighting values −2, 3, 4, 5, 10. For each of the remainder of the candidate bi-prediction MV positions that are offset positions of the center position, the BCW weights are selectively checked. At a first type of offset positions, the LC-RDO stage tries weight indices (BCWIdx) 0, 2, and 3, which correspond to weighting parameter values −2, 4, and 5, respectively. At a second type of offset positions, the LC-RDO stage tries weight indices 1, 2, and 4, which correspond to BCW weighting values 3, 4, and 10, respectively.

The LC-RDO computes the distortion value of a possible w value of a candidate bi-prediction position by using the w value to compute a bi-prediction of ($P_{bi\_pred}$) of the current block that is the weighted average of the L0 prediction ($P_0$) based on the L0 MV and the L1 prediction ($P_1$) based on the L1 MV (Eq. 2). The L0 and L1 MVs are identified based on the candidate bi-prediction position. The distortion of a possible w value is the difference between the raw pixel data of the current block and the bi-prediction.

As illustrated, the placements of the two types of offset positions are arranged in an interleaving pattern. Specifically, the offset positions of the first type are at top-right, top-left, bottom-right, and bottom-left of the center position 700, while the offset positions of the second type are at top, right, left, and bottom of the center position 700. The pattern expands out such that each offset position of one type has diagonal neighbors (top-right, top-left, bottom-right, bottom-left) of the same type and has horizontal and vertical neighbors (top, right, left, bottom) of the opposite type.

In general, LC-RDO tries all possible BCW weighting parameter values only at the center position. For all other candidate bi-prediction MV positions (offset positions), the LC-RDO tries only a subset of the possible weighting parameter values. Furthermore, the offset positions are divided into different groups (e.g., according to the interleave pattern), with the LC-RDO trying different subsets of the possible w values for different groups of offset positions. Still further, BCWIdx=2 (or w=4) is tried for all candidate bi-prediction MV positions, since BCWIdx=2 corresponds to L1 prediction and L0 prediction being weighted equally when computing the bi-prediction result.

By reducing the number of possible w values checked according to the interleaving pattern, the video encoder can reduce the number of SATD operations performed when finding the best bi-prediction MV position and the best BCW weighting parameter value for the best bi-prediction MV position.

As mentioned, the LC-RDO 110 is a hardware circuit that can be shared by multiple different coding tools, including BCW. The bidirectional blending module 319 can be used to compute the weighted average of L0 and L1 predictions for BCW. The bidirectional SATD array 325 can be used to compute the distortion values of different weighting parameter values at the various bi-prediction MV positions. The bi-prediction comparator 345 can be used to identify the best weighting parameter value and the best bi-prediction MV position by comparing the costs associated with the different weighting parameter values at different candidate bi-prediction MV positions.

Example Video Encoder

Figure 8:
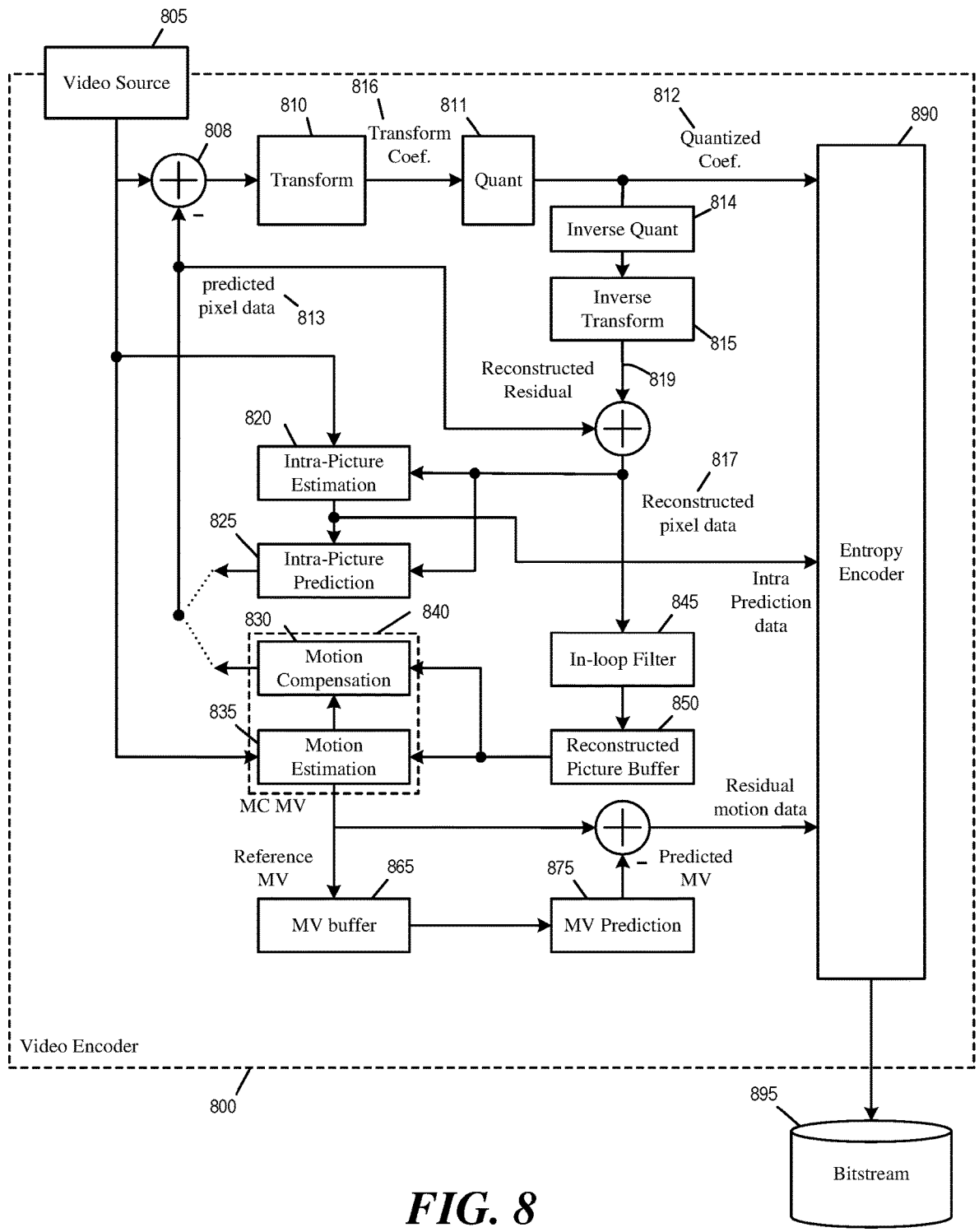
FIG. 8 illustrates an example video encoder that may use an LC-RDO stage and a HC-RDO stage to select a coding tool and/or a prediction candidate for coding a current block.

FIG. 8 illustrates an example video encoder 800 that may use an LC-RDO stage and a HC-RDO stage to select a coding tool and/or a prediction candidate for coding a current block. As illustrated, the video encoder 800 receives input video signal from a video source 805 and encodes the signal into bitstream 895. The video encoder 800 has several components or modules for encoding the signal from the video source 805, at least including some components selected from a transform module 810, a quantization module 811, an inverse quantization module 814, an inverse transform module 815, an intra-picture estimation module 820, an intra-prediction module 825, a motion compensation module 830, a motion estimation module 835, an in-loop filter 845, a reconstructed picture buffer 850, a MV buffer 865, and a MV prediction module 875, and an entropy encoder 890. The motion compensation module 830 and the motion estimation module 835 are part of an inter-prediction module 840.

In some embodiments, the modules 810-890 are modules of software instructions being executed by one or more processing units (e.g., a processor) of a computing device or electronic apparatus. In some embodiments, the modules 810-890 are modules of hardware circuits implemented by one or more integrated circuits (ICs) of an electronic apparatus. Though the modules 810-890 are illustrated as being separate modules, some of the modules can be combined into a single module.

The video source 805 provides a raw video signal that presents pixel data of each video frame without compression. A subtractor 808 computes the difference between the raw video pixel data of the video source 805 and the predicted pixel data 813 from the motion compensation module 830 or intra-prediction module 825. The transform module 810 converts the difference (or the residual pixel data or residual signal 0808) into transform coefficients (e.g., by performing Discrete Cosine Transform, or DCT). The quantization module 811 quantizes the transform coefficients into quantized data (or quantized coefficients) 812, which is encoded into the bitstream 895 by the entropy encoder 890.

The inverse quantization module 814 de-quantizes the quantized data (or quantized coefficients) 812 to obtain transform coefficients, and the inverse transform module 815 performs inverse transform on the transform coefficients to produce reconstructed residual 819. The reconstructed residual 819 is added with the predicted pixel data 813 to produce reconstructed pixel data 817. In some embodiments, the reconstructed pixel data 817 is temporarily stored in a line buffer (not illustrated) for intra-picture prediction and spatial MV prediction. The reconstructed pixels are filtered by the in-loop filter 845 and stored in the reconstructed picture buffer 850. In some embodiments, the reconstructed picture buffer 850 is a storage external to the video encoder 800. In some embodiments, the reconstructed picture buffer 850 is a storage internal to the video encoder 800.

The intra-picture estimation module 820 performs intra-prediction based on the reconstructed pixel data 817 to produce intra prediction data. The intra-prediction data is provided to the entropy encoder 890 to be encoded into bitstream 895. The intra-prediction data is also used by the intra-prediction module 825 to produce the predicted pixel data 813.

The motion estimation module 835 performs inter-prediction by producing MVs to reference pixel data of previously decoded frames stored in the reconstructed picture buffer 850. These MVs are provided to the motion compensation module 830 to produce predicted pixel data.

Instead of encoding the complete actual MVs in the bitstream, the video encoder 800 uses MV prediction to generate predicted MVs, and the difference between the MVs used for motion compensation and the predicted MVs is encoded as residual motion data and stored in the bitstream 895.

The MV prediction module 875 generates the predicted MVs based on reference MVs that were generated for encoding previously video frames, i.e., the motion compensation MVs that were used to perform motion compensation. The MV prediction module 875 retrieves reference MVs from previous video frames from the MV buffer 865. The video encoder 800 stores the MVs generated for the current video frame in the MV buffer 865 as reference MVs for generating predicted MVs.

The MV prediction module 875 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 895 by the entropy encoder 890.

The entropy encoder 890 encodes various parameters and data into the bitstream 895 by using entropy-coding techniques such as context-adaptive binary arithmetic coding (CABAC) or Huffman encoding. The entropy encoder 890 encodes various header elements, flags, along with the quantized transform coefficients 812, and the residual motion data as syntax elements into the bitstream 895. The bitstream 895 is in turn stored in a storage device or transmitted to a decoder over a communications medium such as a network.

The in-loop filter 845 performs filtering or smoothing operations on the reconstructed pixel data 817 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 9:
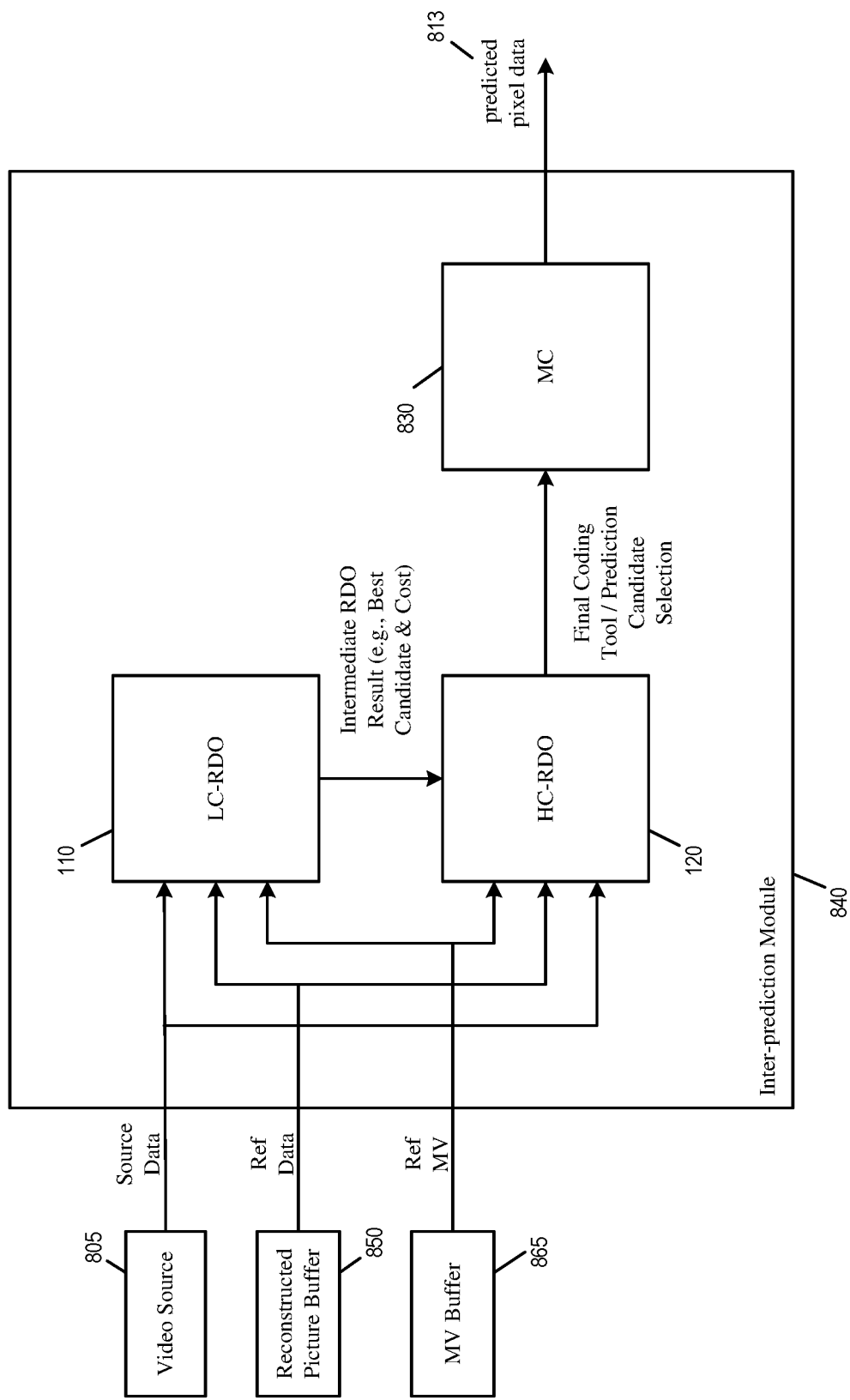
FIG. 9 illustrates portions of the video encoder that implement the LC-RDO and HC-RDO stages.

FIG. 9 illustrates portions of the video encoder 800 that implement the LC-RDO and the HC-RDO. Specifically, the figure illustrates the components of the inter-prediction module 840 of the video encoder 800. As illustrated, the inter-prediction module 840 includes the LC-RDO 110 and the HC-RDO 120 for performing rate-distortion optimization to identify the most suitable coding tool and/or prediction candidate.

Both RDO stages 110 and 120 receive source pixel data from the video source 805, reference pixel data from the reconstructed picture buffer 850, and reference MV data from the MV buffer 865. The LC-RDO 110 uses the received data to identify prediction candidates and calculate costs (e.g., rate and distortion values) for using the various coding tools. The LC-RDO 110 may identify the prediction candidate with the best cost for each coding tool as intermediate RDO result to the HC-RDO 120. The HC-RDO 120 in turn finalizes the selection of the coding tool and the prediction candidate. The motion compensation module 830 (may be part of HC-RDO 120) uses the selected coding tool and prediction candidate to perform motion compensation and produces the predicted pixel data 813.

Figure 10:
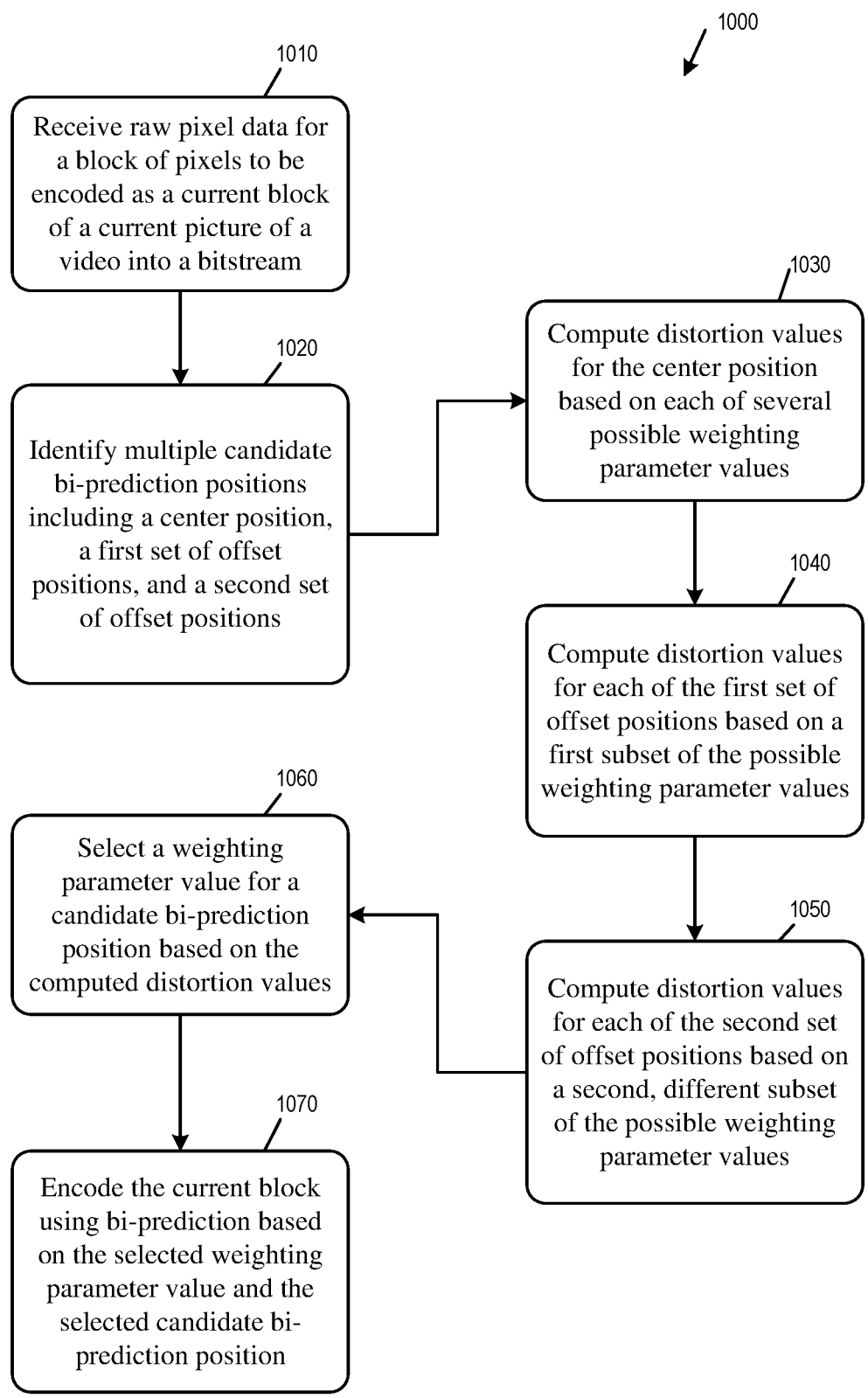
FIG. 10 conceptually illustrates a process for finding a weighting parameter value when using BCW to encode a coding block.

FIG. 10 conceptually illustrates a process 1000 for finding a weighting parameter value when using BCW to encode a coding block. In some embodiments, one or more processing units (e.g., a processor) of a computing device implements the encoder 800 performs the process 1000 by executing instructions stored in a computer readable medium. In some embodiments, an electronic apparatus implementing the encoder 800, specifically the LC-RDO stage 110, performs the process 1000.

The encoder receives (at block 1010) raw pixel data for a block of pixels to be encoded as a current block of a current picture of a video into a bitstream.

The encoder identifies (at block 1020) multiple candidate bi-prediction positions, including a center position, a first set of offset positions, and a second set of offset positions. The first and second sets of offset positions are offset positions of the center position. In some embodiments, the first set of offset positions and the second set of offset positions interleave each other.

The encoder computes (at block 1030) distortion values for the center position based on each of several possible weighting parameter values. The encoder computes (at block 1040) distortion values for each of the first set of offset positions based on a first subset of the possible weighting parameter values. The encoder computes (at block 1050) distortion values for each of the second set of offset positions based on a second, different subset of the possible weighting parameter values.

In some embodiments, the encoder computes a distortion value based on a weighting parameter value at a candidate bi-prediction position by using the weighting parameter value to compute a bi-prediction that is the weighted average of a first prediction based on a first motion vector and a second prediction based on a second motion vector (e.g., according to Eq. 2). The first and second motion vectors are identified based on the candidate bi-prediction position. The distortion of a possible weighting parameter value at a candidate bi-prediction position is a difference between the raw pixel data of the current block and the bi-prediction computed based on the possible weighting parameter value at the candidate bi-prediction position.

In some embodiments, the several possible weighting parameter values includes first, second, third, fourth, and fifth values. For the BCW coding tools, these five possible weighting parameter values correspond to −2, 3, 4, 5, and 10. The first subset of the plurality of possible weighting parameter values comprises the second, third, and fifth values (3, 4, and 10). The second subset of the plurality of possible weighting parameter values comprises the first, third, and fourth values (−2, 4, and 5). In some embodiments, the first and second subsets of the possible weighting parameter values share one possible weighting parameter value (the third value, i.e., 4). The one shared possible weighting parameter value corresponds to weighting the first and second predictions equally (according to Eq. 2).

The encoder selects (at block 1060) a weighting parameter value for a candidate bi-prediction position based on the computed distortion values of the multiple candidate bi-prediction positions for the current block. The encoder encodes (at block 1070) the current block using bi-prediction based on the selected weighting parameter value and the selected candidate bi-prediction position.

Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 11:
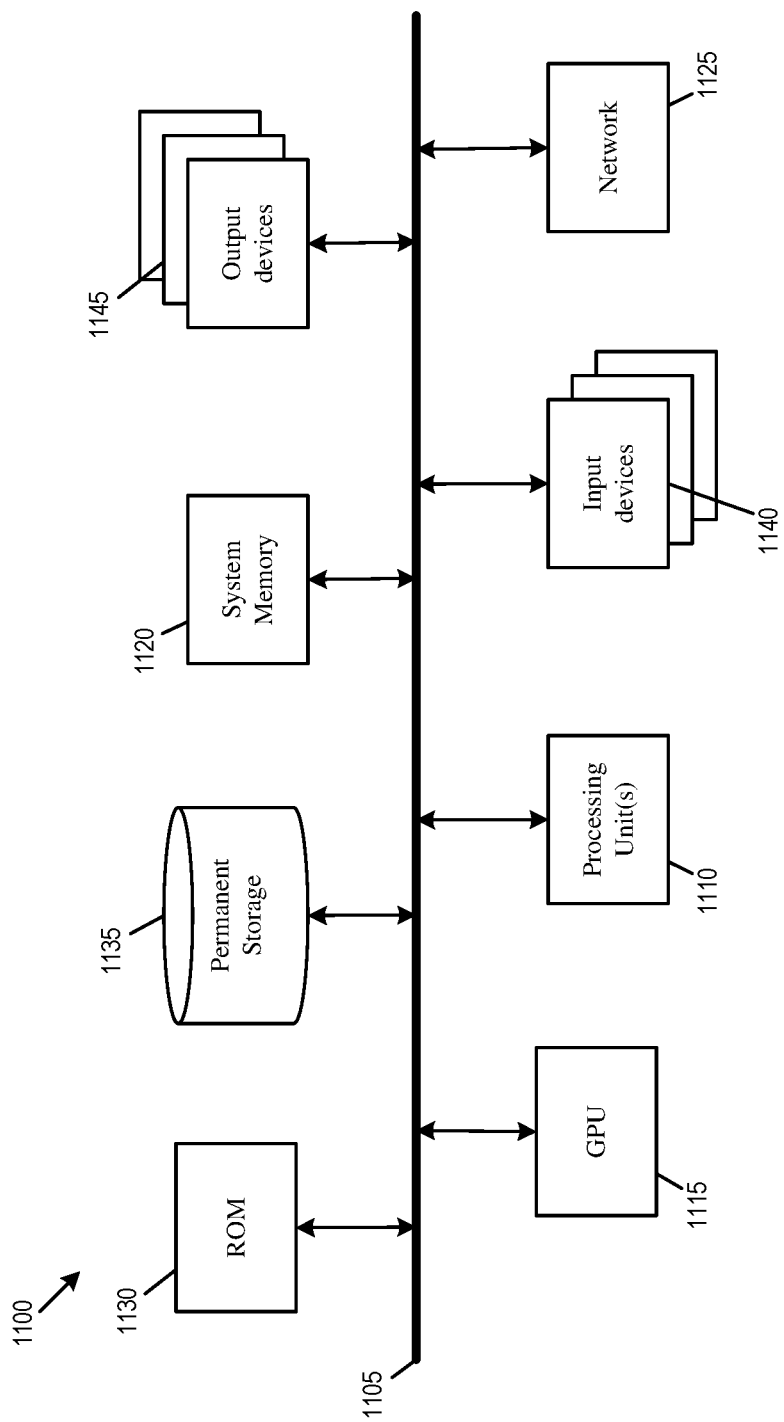
FIG. 11 conceptually illustrates an electronic system with which some embodiments of the present disclosure are implemented.

FIG. 11 conceptually illustrates an electronic system 1100 with which some embodiments of the present disclosure are implemented. The electronic system 1100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1100 includes a bus 1105, processing unit(s) 1110, a graphics-processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the GPU 1115, the read-only memory 1130, the system memory 1120, and the permanent storage device 1135.

From these various memory units, the processing unit(s) 1110 retrieves instructions to execute and data to process in order to execute the processes of the present disclosure. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are used by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the present disclosure use a mass-storage device (such as a magnetic or optical disk and its corresponding disk drive) as the permanent storage device 1135.

Other embodiments use a removable storage device (such as a floppy disk, flash memory device, etc., and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor uses at runtime. In some embodiments, processes in accordance with the present disclosure are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alpha-numeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video encoding method comprising:
receiving raw pixel data for a block of pixels to be encoded as a current block of a current picture of a video into a bitstream;
identifying a plurality of candidate bi-prediction positions comprising a center position, a first set of offset positions, and a second set of offset positions;
computing distortion values for each of the plurality candidate bi-prediction positions based on a plurality of possible weighting parameter values, wherein: (i) the distortion values computed for the center position are computed based on each of the plurality of possible weighting parameter values, (ii) the distortion values computed for the first set of offset positions are computed based on a first subset of the plurality of possible weighting parameter values, and (iii) the distortion values computed for the second set of offset positions are computed based on a second subset of the plurality of possible weighting parameter values, wherein the first subset of the plurality of possible weighting parameter values is different from the second subset of the plurality of possible weighting parameter values;
selecting a weighting parameter value for a candidate bi-prediction position based on the computed distortion values of the plurality of candidate bi-prediction positions for the current block; and
encoding the current block using bi-prediction based on the selected weighting parameter value,
wherein computing a distortion value for coding the current block based on a weighting parameter value at a candidate bi-prediction position comprises using the weighting parameter value to compute a bi-prediction that is a weighted average of a first prediction based on a first motion vector and a second prediction based on a second motion vector, and
wherein the first and second motion vectors are identified based on the candidate bi-prediction position.

2. The video encoding method of claim 1, wherein the first set of offset positions and the second set of offset positions interleave.

3. The video encoding method of claim 1, wherein the first and second subsets of the plurality of possible weighting parameter values share one possible weighting parameter value.

4. The video encoding method of claim 3, wherein computing a distortion value for coding the current block based on the shared one possible weighting parameter value comprises weighting the first and second predictions equally.

5. The video encoding method of claim 1, wherein the distortion of a possible weighting parameter value at a candidate bi-prediction position is a difference between the raw pixel data of the current block and the bi-prediction computed based on the possible weighting parameter value at the candidate bi-prediction position.

6. The video encoding method of claim 1, wherein:
the plurality of possible weighting parameter values comprises first, second, third, fourth, and fifth values,
the first subset of the plurality of possible weighting parameter values comprises the second, third, and fifth values, and
the second subset of the plurality of possible weighting parameter values comprises the first, third, and fourth values.

7. The video encoding method of claim 1, wherein the distortion values are computed by an electrical circuit that is shared by multiple different coding tools.

8. An electronic apparatus comprising:
an encoder circuit configured to perform operations comprising:
receiving raw pixel data for a block of pixels to be encoded as a current block of a current picture of a video into a bitstream;
identifying a plurality of candidate bi-prediction positions comprising a center position, a first set of offset positions, and a second set of offset positions;
computing distortion values for each of the plurality candidate bi-prediction positions based on a plurality of possible weighting parameter values, wherein: (i) the distortion values computed for the center position are computed based on each of the plurality of possible weighting parameter values, (ii) the distortion values computed for the first set of offset positions are computed based on a first subset of the plurality of possible weighting parameter values, and (iii) the distortion values computed for the second set of offset positions are computed based on a second subset of the plurality of possible weighting parameter values, wherein the first subset of the plurality of possible weighting parameter values is different from the second subset of the plurality of possible weighting parameter values;
selecting a weighting parameter value for a candidate bi-prediction position based on the computed distortion values of the plurality of candidate bi-prediction positions for the current block; and
encoding the current block using bi-prediction based on the selected weighting parameter value and the selected candidate bi-prediction position,
wherein computing a distortion value for coding the current block based on a weighting parameter value at a candidate bi-prediction position comprises using the weighting parameter value to compute a bi-prediction that is a weighted average of a first prediction based on a first motion vector and a second prediction based on a second motion vector, and
wherein the first and second motion vectors are identified based on the candidate bi-prediction position.

9. An electronic apparatus comprising:
an encoder circuit configured to perform operations comprising:
receiving raw pixel data for a block of pixels to be encoded as a current block of a current picture of a video into a bitstream;

identifying a plurality of candidate bi-prediction positions comprising a center position, a first set of offset positions, and a second set of offset positions;

computing distortion values for each of the plurality candidate bi-prediction positions based on a plurality of possible weighting parameter values, wherein: (i) the distortion values computed for the center position are computed based on each of the plurality of possible weighting parameter values, (ii) the distortion values computed for the first set of offset positions are computed based on a first subset of the plurality of possible weighting parameter values, and (iii) the distortion values computed for the second set of offset positions are computed based on a second subset of the plurality of possible weighting parameter values, wherein the first subset of the plurality of possible weighting parameter values is different from the second subset of the plurality of possible weighting parameter values;

selecting a weighting parameter value for a candidate bi-prediction position based on the computed distortion values of the plurality of candidate bi-prediction positions for the current block; and encoding the current block using bi-prediction based on the selected weighting parameter value and the selected candidate bi-prediction position, wherein:

the plurality of possible weighting parameter values comprises first, second, third, fourth, and fifth values, the first subset of the plurality of possible weighting parameter values comprises the second, third, and fifth values, and the second subset of the plurality of possible weighting parameter values comprises the first, third, and fourth values.

* * * * *